Figure 1:
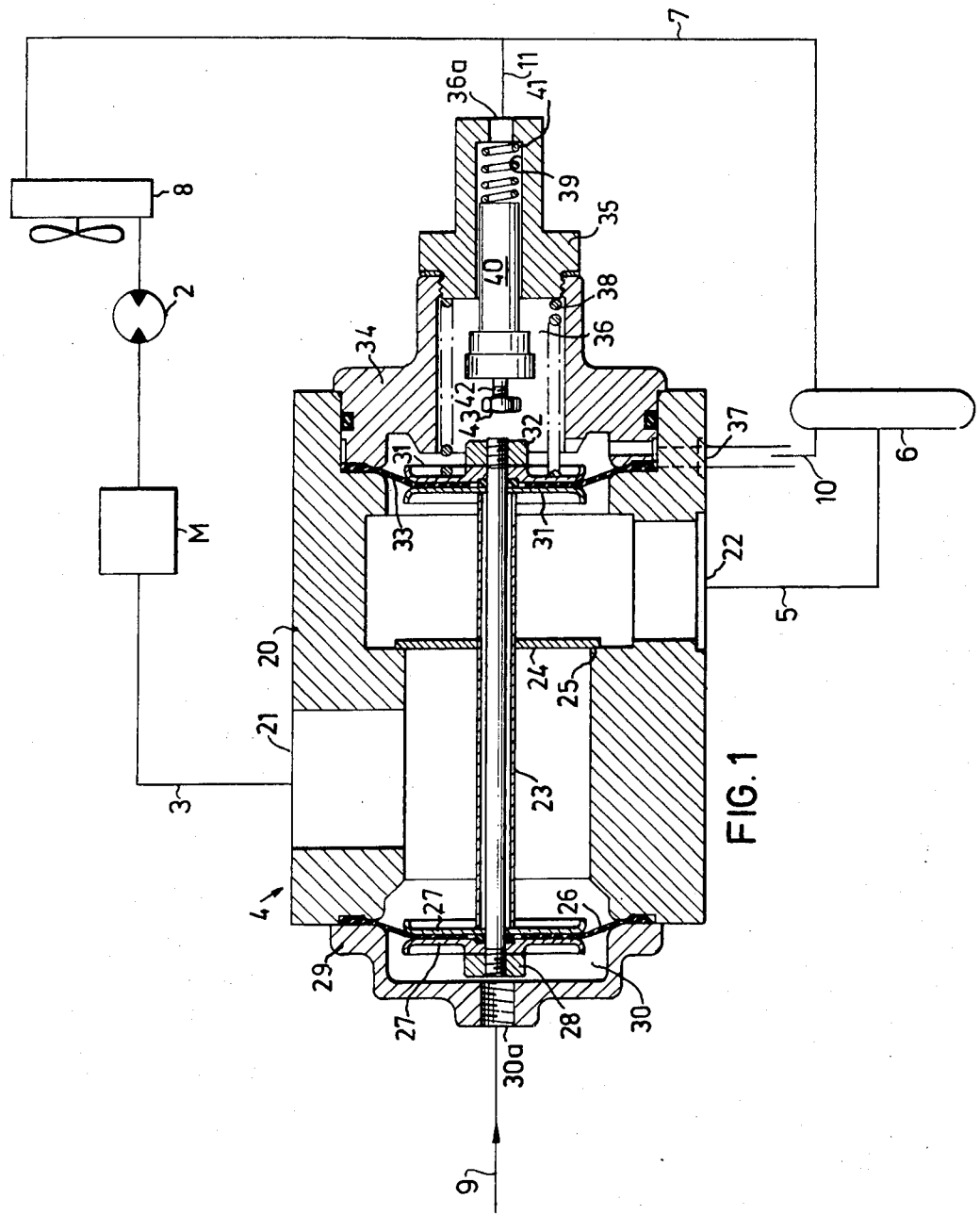

United States Patent

Ternehäll

[11] 4,061,214
[45] Dec. 6, 1977

[54] HYDRODYNAMIC BRAKE DEVICE FOR MOTOR VEHICLES

[75] Inventor: Runo Roy Oskar Ternehäll, Skarhamn, Sweden

[73] Assignee: AB Volvo, Goteborg, Sweden

[21] Appl. No.: 724,065

[22] Filed: Sept. 16, 1976

[30] Foreign Application Priority Data

Sept. 24, 1975 Sweden .............................. 7510702

[51] Int. Cl.$^2$ ......................................... F16D 65/813
[52] U.S. Cl. .................................. 188/277; 188/290
[58] Field of Search .................... 188/277, 290, 296

[56] References Cited

U.S. PATENT DOCUMENTS

| 3,136,392 | 6/1964 | Rodway | 188/277 |
| 3,176,800 | 4/1965 | Trupp | 188/277 |
| 3,451,511 | 6/1969 | Knapp | 188/277 UX |

FOREIGN PATENT DOCUMENTS

| 313,484 | 7/1919 | Germany | 188/277 |

*Primary Examiner*—Duane A. Reger
*Attorney, Agent, or Firm*—Young & Thompson

[57] ABSTRACT

A hydrodynamic brake device for motor vehicles comprises a rotor which is rotatably journalled in a stator shell, the rotor being operably connected to the transmission of the vehicle. The stator shell has a brake fluid inlet and outlet, and a regulator valve is arranged which can be set for regulating the supply of brake fluid to the fluid inlet of the stator shell. A thermostat controls the regulator valve so as to decrease the degree of filling as the temperature of the fluid increases.

9 Claims, 2 Drawing Figures

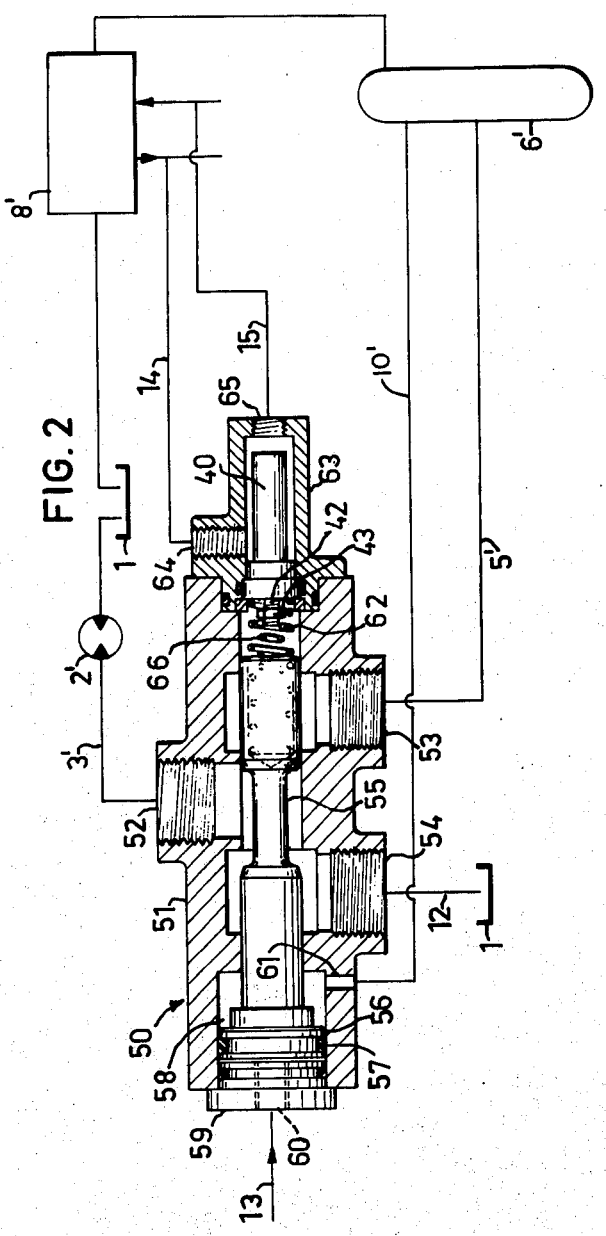

HYDRODYNAMIC BRAKE DEVICE FOR MOTOR VEHICLES

The present invention relates to a hydrodynamic brake device for motor vehicles, comprising a rotor which is rotatably journalled in a stator shell, said rotor being operably connected to the transmission of the vehicle. Said stator shell has a brake fluid inlet and outlet and a regulating valve is arranged which can be set for regulating the supply of brake fluid to the stator shell.

Hydrodynamic brakes have the characteristic that they produce much heat. The rise in temperature in the brake fluid depends on the braking time and the applied braking torque, which in turn depends on the rotor rpm and the degree of filling. If the temperature of the liquid is allowed to climb so high that steam forms in the system, the braking effect is reduced and there is an appreciable delay before the brake can again be used with full efect. Therefore it is important that the available cooling capacity be sufficient to cool the brake fluid, so that no steam is formed.

The dimensioning of a hydrodynamic brake is therefore based on the available cooling capacity and the size of the brake. Thus the maximum braking torque is computed for difficult operating conditions, such as high surrounding temperature and lengthy braking, which require continuous cooling. This means that the highest braking torque will be lower than what the available cooling effect will allow under more favourable operating conditions, e.g. when the external temperature is low and/or when the braking time is short.

The purpose of the present invention is to achieve a hydrodynamic breaking device of the type disclosed in the introduction, which can be dimensioned for a higher braking torque than that described above without the risk of overheating with accompanying formation of steam under difficult operating conditions.

This is achieved according to the invention by arranging a thermostatic valve which determines the maximum degree of filling in relation to the temperature of the brake fluid. For example when braking is initiated, when the fluid temperature is low, the thermostatic valve allows the brake to be kept completely full to give the highest possible braking torque. During braking the thermostat senses the rise in temperature in the fluid and gradually reduces automatically the degree of filling and thereby the braking torque to a value at which the cooling is sufficient to keep the fluid temperature at a permissible level. The braking torque resulting from the lowering of the degree of filling corresponds to the maximum torque, for which one was previously forced to dimension the brake. The advantage of the invention is thus that a larger braking force than previously can be applied under most operating conditions.

The invention will be described in more detail with reference to the embodiments shown in the accompanying drawings in which FIG. 1 shows a simplified connection diagram for a hydrodynamic brake system with a longitudinal section through a combined regulator and thermostatic valve according to the invention.

FIG. 2 shows a corresponding connection diagram with a second embodiment of a valve according to the invention.

In FIG. 1 a valve, generally designated 4, is coupled directly into the cooling system of a motor M, whose water pump and radiator are designated 2 and 8 respectively. The pump 2 feeds fluid via a conduit 3 to the valve 4, which is connected via a feeder conduit 5 to a hydrodynamic brake 6, which can be of the type described in Swedish Patent Application No. 7306859-5. A return conduit 7 goes from the brake 6 to the radiator 8. The regulator valve 4 is connected to a compressed air conduit 9 with a manual control valve (not shown), by means of which the operator can influence the regulator valve 4 to regulate the supply of fluid to the brake 6. A feed-back conduit 10 from the brake to the valve 4 goes from a location in the vicinity of the periphery of the brake where the pressure represents the braking torque, and this pressure balances the control pressure in conduit 9, as will be described in more detail below. A return conduit 11 connects the valve 4 to the return conduit 7 to remove the fluid supplied through conduit 10. The diagram is only intended to illustrate the principle and is therefore greatly simplified by leaving out conduits and valves for normal coolant circulation between the motor and radiator when the brake is empty.

The valve 4 has a housing 20 with an inlet 21 from the conduit 3 and an outlet 22 to the conduit 5. A valve spindle 23 is displaceably arranged in the housing, and said spindle supports a valve disc 24, which in the position shown rests on a valve seating 25, so that the connection between the inlet 21 and the outlet 22 is broken. The spindle 23 carries on its left end a membrane 26, which is kept in place by two washers 27 and a nut 28 and whose peripheral edge is held between the end of the housing and a cover 29. The cover 29 and the membrane 26 define a compressed air chamber 30 with an inlet 30a from compressed air conduit 9. At its right-hand end the spindle 23 carries in a corresponding manner, with the aid of two washers 31 and a nut 32, a membrane 33, whose peripheral edge is held between the housing 20 and a cover 34 with a threaded opening, into which a plug 35 is screwed. The membrane 33, the cover 34, and the plug 35 define a chamber 36 with an inlet 37 for the feed-back conduit 10 from the brake 6. The plug 35 has an outlet 36a to the return conduit 11. A helical spring 38 is tensioned between the plug 35 and the right-hand washer 31, which bears on the spindle 23 to hold the valve disc 24 against its seating 25 when the valve is not acted upon.

The plug 35 has a cylindrical bore 39 which holds, with some play, a thermostat member 40, the right end of which rests against a stiff spring 41 disposed in the bore 39. The thermostat element has a chamber filled with a working medium, into which a plunger 42 penetrates which at its outer end carries a nut 43 and forms a stop which determines the right-hand end position of the spindle 23.

The system functions as follows.

When the driver wishes to activate the hydrodynamic brake 6, he switches the control valve (not shown), whereby compressed air is supplied to the chamber 30. Valve disc 24 is thereby lifted from its seating 25 by the pressure in chamber 30 and the brake is filled via the conduit 5. At the same time a pressure is built up in chamber 36 via the feed-back conduit 10. This pressure is extracted from a place in the brake where the pressure represents the braking torque. Thus an equilibrium is brought about in the valve in which a certain degree of filling and thereby a certain braking torque is obtained, which is dependent on the operating pressure set by the control valve and the speed at the time. If the speed of the vehicle, and thereby the braking torque, is reduced the feed-back pressure drops, and the valve under the influence of the pressure in chamber 30 opens further to increase the degree of filling. The feed-back pressure then increases and the set braking torque is maintained.

During the braking the plunger 42 of the thermostat member 40 adjusts itself in accordance with the temperature of the fluid flowing through the chamber 36. If the temperature exceeds a certain value the plunger assumes such a position that it forms a stop for the spindle and prevents the valve from opening more to increase the degree of filling and maintain the braking torque originally set, when the speed drops. If the speed is constant during braking, the thermostat plunger 42 will displace the spindle 23 to the left when an upper temperature level is exceeded, so that the flow to the brake is throttled and the degree of filling is reduced.

In extreme cases, e.g. in an emergency, the brake can be filled completely and the fluid caused to boil by subjecting the chamber 30 to extra high pressure, so that the spindle is subjected to a force which overcomes the force from the support spring 41 of the thermostat member. Thus the whole thermostat member 40 can be displaced to the right and allow the valve to open completely, independent of the temperature of the fluid.

Normally the spring 41 acts as a damping means which dampens impact on the thermostat.

FIG. 2 shows another embodiment of a combined control and thermostat valve designed for oil as a braking medium, in which the corresponding parts have the same reference numerals as in FIG. 1. The valve generally designated 50 has a housing 51 with an inlet 52 from the conduit 3' and an outlet 53 to conduit 5'. Furthermore there is a return outlet 54 to a return conduit 12 leading to a tank 1. A valve slide 55 is displaceably disposed inside the housing 51, the left-hand end of which slide, as seen in the figure, is contructed as a plunger 56 with a sealing ring 57. The plunger is displaceable in a space 58 in the housing 51, which is sealed by a lid 59 with an inlet 60, to which a hydraulic conduit 13 leads from a manual control valve (not shown). A duct 61, which is connected to the feed-back conduit 10' from the brake 6' leads to the space 58.

The setting of the degree of filling of the brake 6' is accomplished according to the same principle as for the preceding valve by balancing the operating pressure on the left side of the plunger 56 and the feed-back pressure on the right side of the plunger together with the pressure from a return spring 62 acting on the right-hand end of the slide.

The thermostatic control of the valve 50 is accomplished, as in the valve 4 with the help of a thermostat 40, but with the difference that the temperature of the brake fluid is sensed indirectly by sensing of the temperature of the coolant in the radiator 8'. For that purpose the thermostat 40 is disposed in a thermostat housing 63 attached to the valve housing 51 with an inlet 64 and an outlet 65, which are connected via conduits 14 and 15 to the inlet and outlet for coolant in the radiator 8'. The thermostat 40 is fixed in the housing 63 and damping is achieved by the nut of the plunger 42 acting on the slide 55 via a spring 66.

The invention is of course not limited to the embodiments described above, in which the regulator and thermostat functions are combined in the same valve. Rather, the thermostatic valve can also be a separate valve. Instead of the described placement of the valve on the inlet side for regulating the flow to the brake, a separate thermostat valve can be arranged on the outlet side of the brake to regulate the return flow. In this case there is a reversed regulation with the help of the thermostat, i.e. it increases the outlet area as the temperature increases.

What I claim is:

1. Hydrodynamic brake device for motor vehicles, comprising a rotor, rotatably journalled in a stator shell, which rotor is operably connected to the transmission of the vehicle, said stator shell having a fluid inlet and outlet, a regulator valve for regulating the supply of brake fluid to the fluid inlet of the stator shell and a thermostat that controls said regulator valve for regulating the degree of filling of the stator shell depending on the temperature of the brake fluid, said thermostat controlling said regulator valve so as to decrease the degree of filling as the temperature of the fluid increases.

2. Brake device according to claim 1, in which the regulator valve and the thermostat are combined in a thermostat controlled regulator valve unit.

3. Brake device according to claim 2, in which the thermostat has an element movable as the temperature varies, which forms a stop which determines the end position in the opening direction of the valve body of the regulator valve unit.

4. Brake device according to claim 1, in which the thermostat is arranged to sense directly the temperature of the brake fluid.

5. Brake device according to claim 1, in which the thermostat is disposed to sense the temperature in the coolant flowing through a radiator for cooling the brake fluid.

6. Brake device according to claim 5, in which the regulator valve comprises a valve housing with a fluid inlet and outlet, a valve slide movable in the housing for regulating the flow between the valve inlet and valve outlet, one end of the valve slide having a portion constructed as a plunger that slides in a chamber which on one side of the plunger communicates with the stator shell and on the other side of the plunger communicates with a pressure source adapted to be controlled by a manual control valve, whereby the pressure in the stator shell attempts to displace the slide in the closing direction, the thermostat being disposed in a thermostat housing attached to the valve housing, said coolant in the radiator flowing through said thermostat housing.

7. Brake device according to claim 1, which is so connected to the cooling system of the motor vehicle that the coolant of the motor is also the brake fluid.

8. Brake device according to claim 1, in which the regulator valve comprises a valve housing with a fluid inlet and an outlet, a passage between the fluid inlet and outlet of the valve housing, a valve seating surrounding said passage, a valve body movable toward and away from the valve seating, a spindle extending on both sides of said valve body, individual membranes to which both ends of said spindle are secured, said membranes defining first and second chambers on either side of said passage, said first chamber being adapted to communicate via a manual control valve with a pressure source, the pressure in said first chamber attempting to displace the valve body in the opening direction, said second chamber communicating with the stator shell, the pressure in said second chamber attempting to displace the valve body in the closing direction, said thermostat being disposed in said second chamber and directly sensing the temperature of the brake fluid.

9. Braking device according to claim 8, in which said thermostat is mounted for movement parallel to the spindle and has a portion engageable with the spindle, and a spring against which rests the end of the thermostat remote from the spindle.

* * * * *